(No Model.)

J. J. T. DEHEKKER.
AUTOMATIC GRAIN WEIGHER AND REGISTER.

No. 350,816. Patented Oct. 12, 1886.

Witnesses:
John Ferdinand Werbin
Robert Roger

Inventor:
John James Theodore Dehekker

UNITED STATES PATENT OFFICE.

JOHN JAMES THEODORE DEHEKKER, OF SEDGWICK CITY, KANSAS.

AUTOMATIC GRAIN WEIGHER AND REGISTER.

SPECIFICATION forming part of Letters Patent No. 350,816, dated October 12, 1886.

Application filed October 22, 1885. Serial No. 180,615. (No model.)

*To all whom it may concern:*

Be it known that I, JOHN JAMES THEODORE DEHEKKER, a citizen of the United States, residing at Sedgwick City, in the county of Harvey, in the State of Kansas, have invented a new and useful Automatic Grain Weigher and Register, of which the following is a specification.

My invention is intended to furnish means by which grain, flour, and other commodities may be weighed or measured, and their weight or measure be accurately registered. Both the weighing and registering devices are automatic in action, and while very useful in many situations are most effective when used in connection with an elevator. In this latter connection it is shown in this application.

Figure 1:
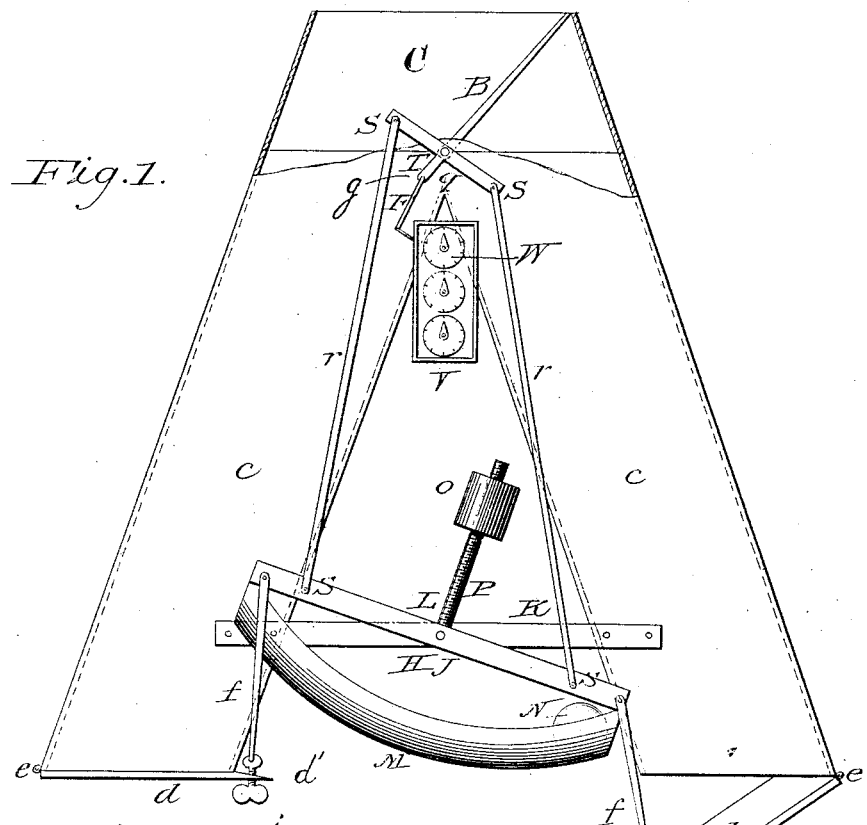
Figure 2:
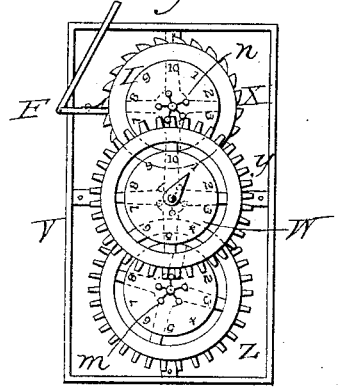
Figure 3:
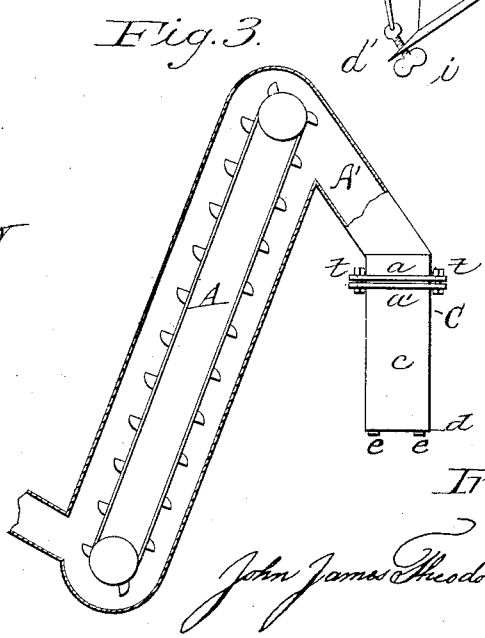

The accompanying drawings illustrate the invention, Figure 1 being a vertical front view of it with the upper portion partly in section. Fig. 2 is an enlarged view of the register in detail, and Fig. 3 is a side view of the receiver attached to an elevator vent-spout.

Similar letters denote corresponding parts in the several views.

A is an elevator, and A' is an elevator-spout, from which the grain runs into the receiver C. The spout and the receiver are provided with projections $a$ $a'$, having coinciding holes for the thumb-screws $t$ $t$, the holes in the projection $a'$ only being threaded. By these means a close joint is secured and the receiver is made to hang vertically, which is important.

The receiver C connects with two chambers, $c$ $c'$. A cut-off door, B, within the receiver C, and journaled to it in front and rear, oscillates in such a manner that it alternately closes the entrances to the chambers $c$ $c'$. The bottom of each chamber has an exit-door, $d$ $d$, opening downward and hinged at its outer edge at $e$ $e$. A projection, $d'$, having a vertical threaded hole, is formed on each door $d$, and thumb-screws $i$ $i$ are fitted to these holes. Two rods, $f$ $f$, have each one end pivotally attached to a screw, $i$, while the other end is pivoted to the end of a walking or balance beam, H, said beam having the fulcrum-support J on the cross-bar K, which is fixed to the chambers $c$ $c'$. A threaded stem, P, bearing a threaded weight, O, rises at a right angle from the middle of the beam H, and a curved track, M, is fixed to the under side of the beam H, the track M being grooved to retain a spherical weight, N, which rolls therein. A cross-bar, T, is fixed upon the projecting end of the shaft, which supports the door B, and is at right angles to said door. Pivoted rods $r$ $r$ connect the corresponding ends of the bar T and the beam H.

V is an indicator or register of weights. It consists of three wheels, X, Y, and Z, properly journaled in the case containing them. The wheel X has peripheral notches I and a pinion, $n$, adapted to engage the cogs in wheel Y, the cogs of wheel Y engaging the pinion $m$ on wheel Z. Each wheel is provided with a circular face or dial, numbered from one to ten, and an adjustable pointer, W. The wheels X and Y have each fifty notches or cogs, and the pinions $n$ $m$ have each five cogs. By this numerical relation when the wheel X has revolved one hundred times, the wheel Y will have revolved ten times and the wheel Z once.

The register is actuated by a spring-pawl, F, attached to a projection, $g$, on the cross-bar T. This pawl F engages the notches I on the wheel X. The pointers W have friction connection with their arbors, so that they may be easily set without disturbing the wheels.

The invention operates in the following manner: The grain running from the elevator pours into the receiver C and thence into the chamber $c$, until its weight overbalances the weights O and N, and the door $d$ is forced open, allowing the grain to escape. At the same time the cut-off B closes over the chamber $c$ and the chamber $c'$ is opened, into which the grain runs until the weights are again overbalanced, when the door $d'$ opens and the cut off B returns to its former position. With the opening and closing of the doors $d$ $d'$ the working-beam H is set in motion, and the ball N, rolling always to the lowest end of its track, and the weight O determine at what instant the limit of weight is reached which reverses the positions of the doors. With the oscillation of the door B the pawl F impels the registering mechanism, requiring one movement each way to move the pointer one figure on the wheel X. I prefer to adjust the weights so that they will balance fifty pounds.

Consequently each figure on the dial X will represent so many hundred pounds, while the figures on the dial Y will denote thousands, and those on the dial Z ten thousands of pounds; but the instrument may be set for other weights or quantities by using balls N of varying sizes and by the vertical adjustment of the weight O.

Having described my invention, what I claim, and desire to secure by Letters Patent of the United States, is—

A grain-weigher formed of a receiver, C, two chambers, $c\ c'$, connected therewith, a door, B, on a shaft, $q$, exit-doors $d\ d$, hinged at $e\ e$, projections $d'\ d'$, thumb-screws $i\ i$, pivoted rods $f\ f$, balance-beam H, having the beam-center J on the cross-bar K, grooved track M, ball N, threaded stem P, threaded weight O, pivoted rods $r\ r$, and beam T, fixed to the shaft $q$, as described.

JOHN JAMES THEODORE DEHEKKER.

Witnesses:
JOHN FERDINAND WERBIN,
ROBERT ROGERS.